United States Patent
Rabon et al.

(10) Patent No.: US 12,507,771 B1
(45) Date of Patent: Dec. 30, 2025

(54) SOLAR POWERED PATIO UMBRELLA

(71) Applicants: Christopher Rabon, Columbia, SC (US); Lauren Kelly, Columbia, SC (US)

(72) Inventors: Christopher Rabon, Columbia, SC (US); Lauren Kelly, Columbia, SC (US)

( * ) Notice: Subject to any disclaimer, the term of this patent is extended or adjusted under 35 U.S.C. 154(b) by 216 days.

(21) Appl. No.: 18/232,484

(22) Filed: Aug. 10, 2023

(51) Int. Cl.
*A45B 23/00* (2006.01)

(52) U.S. Cl.
CPC ...... *A45B 23/00* (2013.01); *A45B 2023/0012* (2013.01); *A45B 2200/1018* (2013.01); *A45B 2200/1027* (2013.01)

(58) Field of Classification Search
CPC .... A45B 2200/0012; A45B 2200/1027; A45B 2200/1018
See application file for complete search history.

(56) References Cited

U.S. PATENT DOCUMENTS

| | | | |
|---|---|---|---|
| 5,273,062 A * | 12/1993 | Mozdzanowski | F24S 25/10 248/530 |
| 7,513,267 B2 * | 4/2009 | Gendriesch | A45B 23/00 135/31 |
| 8,104,491 B2 * | 1/2012 | Li | F24S 25/12 135/21 |
| 9,125,462 B2 * | 9/2015 | Akin | H02J 7/00 |
| 9,209,650 B2 | 12/2015 | Nita | |
| 10,153,656 B2 | 12/2018 | Volin | |
| 2004/0228118 A1 * | 11/2004 | Peterson | A45B 3/04 362/102 |
| 2007/0283987 A1 * | 12/2007 | Reyes | A45B 3/04 320/101 |
| 2009/0071516 A1 * | 3/2009 | Li | H04R 1/026 135/16 |
| 2010/0269870 A1 * | 10/2010 | You | A45B 3/04 135/16 |
| 2010/0326849 A1 * | 12/2010 | Trimarche | A45B 23/00 206/223 |
| 2015/0320162 A1 * | 11/2015 | Akin | H02J 7/02 135/16 |
| 2016/0153650 A1 * | 6/2016 | Chien | F21V 33/0004 362/253 |
| 2016/0338457 A1 * | 11/2016 | Gharabegian | G01J 1/42 |
| 2018/0000241 A1 * | 1/2018 | Wei | A45B 23/00 |

\* cited by examiner

*Primary Examiner* — Noah Chandler Hawk
(74) *Attorney, Agent, or Firm* — Sanchelima & Associates, P.A.; Jesus Sanchelima; Christian Sanchelima

(57) ABSTRACT

A solar powered patio umbrella including an umbrella assembly, a solar panel assembly, a base assembly and an entertainment assembly. The umbrella assembly includes an umbrella. The solar panel assembly includes a solar pan located on a top portion of the umbrella. The base assembly includes a base and a battery bank embedded therein. The base supports the umbrella in an upright position. The solar panel powers the battery bank. The entertainment assembly includes a housing having a projector and at least one speaker embedded therein. The entertainment assembly is formed in a central portion of a shaft of the umbrella. The entertainment assembly is powered by the battery bank.

1 Claim, 3 Drawing Sheets

SOLAR POWERED PATIO UMBRELLA

BACKGROUND OF THE INVENTION

1. Field of the Invention

The present invention relates to a solar powered patio umbrella and, more particularly, to a solar powered patio umbrella that includes a solar panel capable of powering an entertainment station integrally formed in the umbrella.

2. Description of the Related Art

Several designs for umbrellas have been designed in the past. None of them, however, include an entertainment station including USB ports, a clock, wireless charging and a laser projector.

Applicant believes that a related reference corresponds to U.S. Pat. No. 9,209,650 issued for a tabletop, solar-powered charging electricity providing renewable devices having a shade structure for outdoor use and having a backup battery located in the base. Applicant believes that another related reference corresponds to U.S. Pat. No. 10,153,656 issued for a five-device-in-one-solar-charging sun-visor foldable tiltable workstation. None of these references, however, teach of a patio umbrella comprising an umbrella having integral solar panels, a storage battery located in the base, LED illumination in the support post, and an entertainment and power station.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a solar powered patio umbrella that includes a base stand which serves as a battery bank and provides stability to the present invention.

It is another object of this invention to provide a solar powered patio umbrella that includes a built-in LED light which permits to light a space near the umbrella.

It is still another object of the present invention to provide an umbrella adapted to support a solar panel, where the solar panel powers the battery bank and the battery bank can be used to power external devices.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
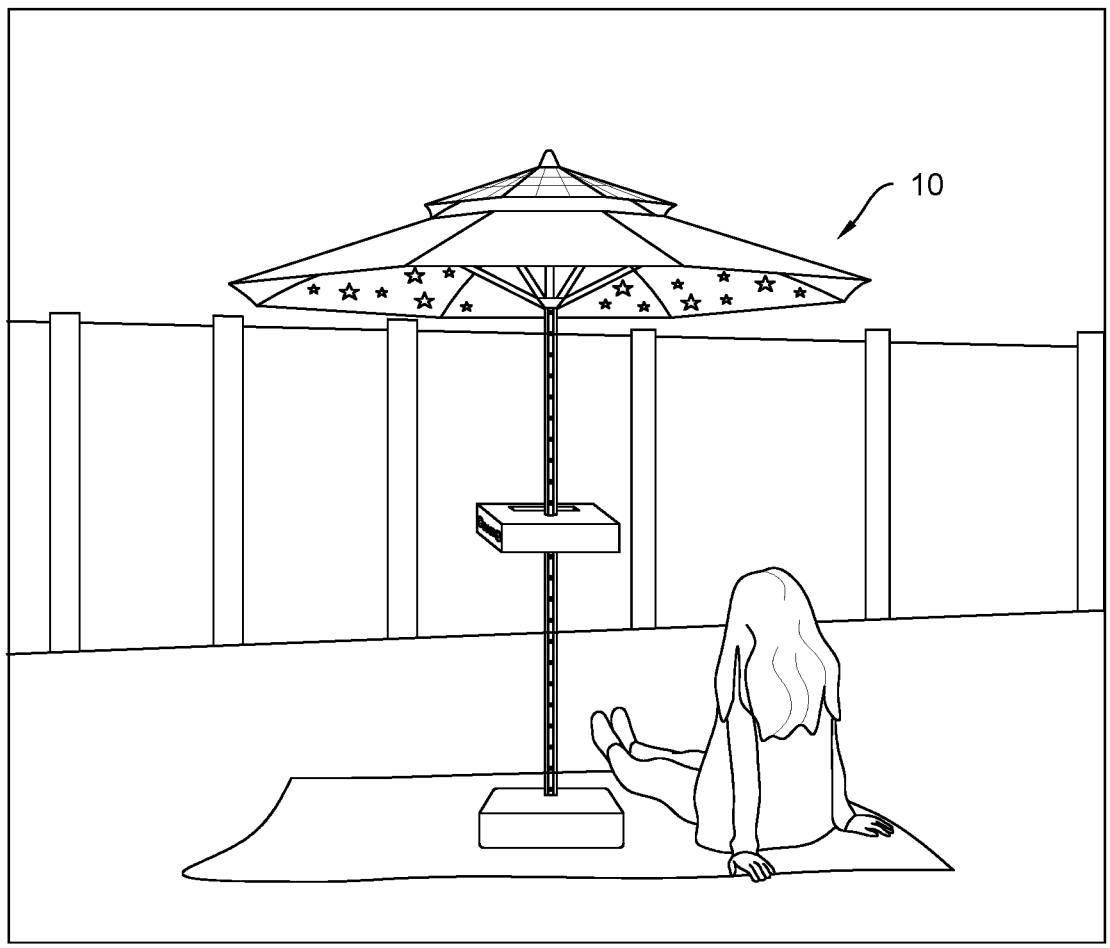
FIG. 1 represents an isometric operational view of the present invention 10.

Referring now to the drawings, where the present invention is generally referred to with numeral 10, it can be observed that it basically includes an umbrella assembly 20, a solar panel assembly 40, an entertainment assembly 60 and a base assembly 80. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

Figure 2:
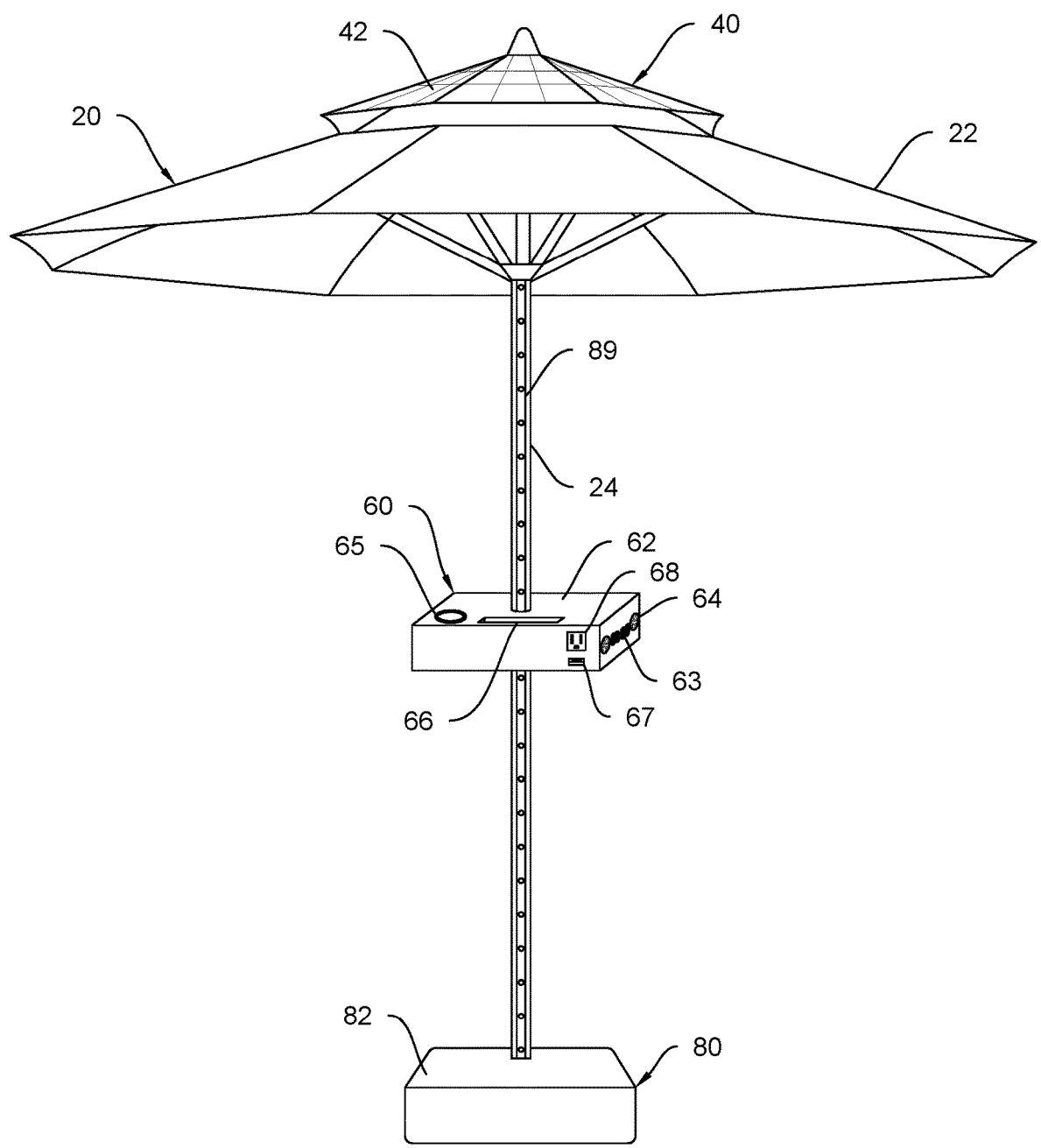
FIG. 2 shows an isometric view of the present invention 10. The present invention 10 includes an umbrella assembly 20, a solar panel assembly 40, an entertainment assembly 60 and a base assembly 80.
Figure 3:
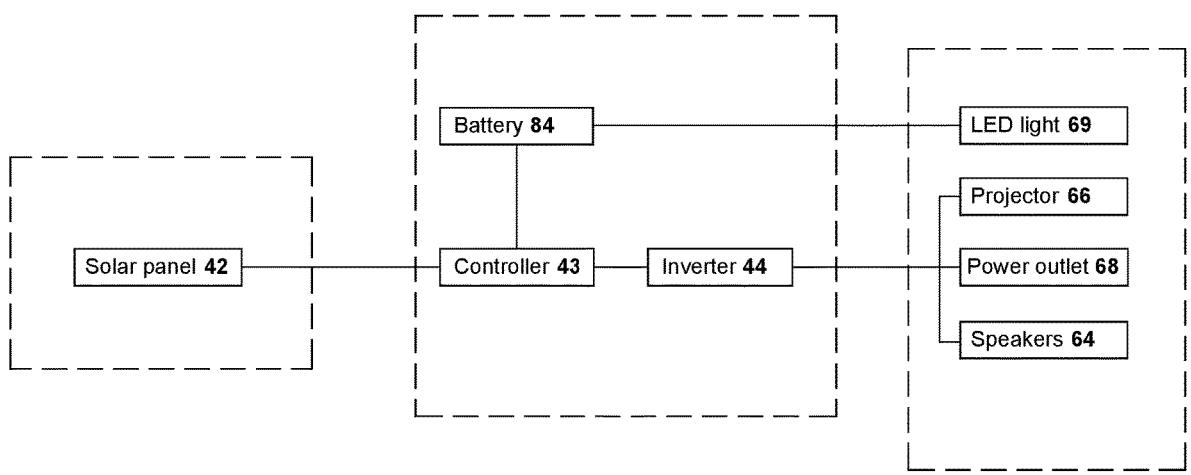
FIG. 3 shows a schematic view of the present invention.

Referring now to FIG. 2 it can be observed that the umbrella assembly 20 includes an umbrella 22. In a preferred embodiment the umbrella 22 may be a patio umbrella. The umbrella 22 may be made of nylon, polyethylene, or any other suitable material. The umbrella 22 may have a hemispherical hollow covering protruding from a top of a shaft 24. The shaft 24 may preferably have a cylindrical shape. It also may be suitable for the shaft 24 to have a rectangular shaft, a triangular shape, or any other shape. The shaft 24 may extend perpendicular from the base assembly 80. The solar panel assembly 40 may be installed on top of the umbrella 22.

The panel assembly 40 may include a solar panel 42, a controller 43 and an inverter 44. As best illustrated in FIG. 2 the solar panel 42 may be attached to the uppermost end of the umbrella 22. In one embodiment the solar panel 42 is integrally formed on a top end of the umbrella 22. The solar panel 22 may be a flexible solar panel in the form of thin-film solar panels. It also may be suitable for the solar panels 22 to be monocrystalline solar panels. The solar panel 42 may be adapted to provide power to the entertainment assembly 60 and to a battery bank 84 of the base assembly 80. The solar panel 42 may be connected to the controller 43. The controller 43 may be a charge controller. The charge controller 43 may limit the rate at which electric current is added to or drawn from battery bank 84.

The base assembly 80 may include a base 82 and a battery bank 84. In a preferred embodiment the battery bank 84 may be enclosed within the base 82. The battery bank 84 may include any type of battery bank as known in the prior art for solar energy applications. The battery bank 84 The battery bank 84 may be connected to the inverter 44. The inverter 44 may convert direct current from the battery bank 84 to an usable alternating current. The base 82 may have a rectangular shape, a cylindrical shape, or any other suitable shape. The base 82 may provide support to the umbrella 22. Shaft 24 may be hollow to permit connections between the entertainment assembly 60, with the components of the base assembly 80 and the solar panel 42. In a preferred embodiment the battery bank 84, the charge controller 43 and the inverter 44 may be located within the base. It also may be suitable for the charge controller 43 and the inverter 44 to have any other configuration in the umbrella assembly 20. The entertainment assembly 60 may include electronic elements being powered by means of the solar panels 42 in an off-grid configuration. It should be understood that some of the components of the entertainment assembly 60 may be connected directly to the battery or to the inverter depending on the type of current (AC or DC) they use. It also should be understood that battery bank 84, the charge controller 83 and the inverter 44 may include any type of battery bank 84, charge controller 83 and inverter 44 known in the prior art.

Referring now to FIG. 2 it can be observed that the entertainment assembly 60 may include a housing 62, a power outlet 68, at least one speaker 64, a digital clock 64, an USB port 67, projector 66, at least one wireless charger 65 and Light Emitting Diodes Lights 89. In a preferred embodiment the LED lights 89 may be disposed about a length of the shaft 24. It also may be suitable for the LED lights 89 to be located at the canopy of the umbrella 22 or to have any other configuration in the umbrella 22.

The housing 62 may be located at a central portion of the shaft 24. The housing 62 may have a rectangular shape. It also may be suitable for the housing 62 to have a cylindrical shape, a triangular shape, or any other suitable shape. The housing 62 and the base 82 may be made of plastic. In one embodiment the housing 62 may include vents. It should be understood that the housing assembly 62 may include a microcontroller, a wireless communication module, and other elements not listed herein but widely known in the prior art.

The power outlet 68, the at least one speaker 64, the digital clock 64, the USB port 67 and the projector 66 may be embedded in the housing 62. The projector 66 may be located on a top portion of the housing 62. The projector 66 may be a laser project which projects figures or illuminates an upper surface. The projector 66 may also be used to project images or video. The USB port 67 may include a plurality of USB ports. In one embodiment the USB port 67 may be used to charge a mobile device. It also may be suitable for the USB port 67 to be used to transmit media to the entertainment assembly 60 in such a way that the media can be played by at least one speaker 63 or the projector 66.

The wireless charger 65 may be located on a top end of the housing 62. The wireless charger 62 may be used to charge a mobile device. In a preferred embodiment the top end of the housing is large enough and planer so that it can be used as a table. The at least one speaker 64 may play predetermined sounds. In a preferred embodiment the at least one speaker 64 may receive the predetermined sounds from an mobile device through the USB port or by means of a bluetooth module. The digital clock 63 may be a LCD or LED display where the current time is displayed. It may be suitable for the entertainment assembly 60 to include The present invention 10 relates to a solar patio umbrella 22 having an entertainment assembly 60 with multiple electronic elements, where the entertainment assembly 60 is powered through a solar panel 42. Preferably, the solar panel 42 is integrally formed in the top end of the umbrella 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A solar powered patio umbrella, consisting of:
    an umbrella assembly, wherein said umbrella assembly includes an umbrella, said umbrella having a shaft;
    a solar panel assembly, wherein said solar panel assembly includes a solar panel, a charge controller and an inverter, wherein said solar panel is a thin-film solar panel integrally formed in an top portion of said umbrella;
    a base assembly, wherein said base assembly includes a base and a battery bank, wherein said base supports said umbrella in an upright position, said battery bank is located within said base, wherein said solar panel powers said battery bank, wherein said charge controller is connected to said solar panels and said battery bank to limit the rate at which electric current is added to or drawn from said battery bank; and
    an entertainment assembly, said entertainment assembly including a housing having a projector, a display, a USB port, LED lights, a wireless charger and at least one speaker embedded therein; wherein said entertainment assembly is integrally formed on a central portion of a shaft of said umbrella, said entertainment assembly is powered by means of said battery bank, wherein said inverter is configured to convert a direct current to an alternating current to power said entertainment assembly, wherein said LED lights are embedded in said shaft, wherein a mobile device is connected to said USB port and said wireless charger to be charged, wherein said mobile device is configured to be connected to said USB port transmit media to said projector and said at least one speaker, wherein said display is configured to display a time in one of the walls of said housing.

* * * * *